US012640026B2

(12) United States Patent
Pace et al.

(10) Patent No.: US 12,640,026 B2
(45) **Date of Patent: *May 26, 2026**

(54) LID OF AN ASPIRATING SMOKE DETECTOR DEVICE

(71) Applicant: Honeywell International Inc., Charlotte, NC (US)

(72) Inventors: Gianluca Pace, Trieste (IT); Erika Simeoni, Staranzano (IT); Mauro Miheli, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/408,794

(22) Filed: Jan. 10, 2024

(65) Prior Publication Data

US 2024/0185699 A1 Jun. 6, 2024

Related U.S. Application Data

(63) Continuation of application No. 17/335,350, filed on Jun. 1, 2021, now Pat. No. 11,900,776.

(51) Int. Cl.
*G08B 17/10* (2006.01)

(52) U.S. Cl.
CPC .................................... *G08B 17/10* (2013.01)

(58) Field of Classification Search
None
See application file for complete search history.

(56) References Cited

U.S. PATENT DOCUMENTS

| | | | |
|---|---|---|---|
| 4,680,576 | A | 7/1987 | Bauer |
| 5,966,079 | A | 10/1999 | Tanguay |
| 9,134,716 | B2 | 9/2015 | Cole et al. |
| 9,824,564 | B2 | 11/2017 | Bressanutti et al. |
| 10,115,280 | B2 | 10/2018 | Bressanutti et al. |
| 10,877,011 | B2 | 12/2020 | Cummings et al. |
| 2001/0038337 | A1 | 11/2001 | Wickstead |
| 2020/0116688 | A1 | 4/2020 | Bertini et al. |

FOREIGN PATENT DOCUMENTS

| | | | | | |
|---|---|---|---|---|---|
| CN | 1256411 | | | 6/2000 | |
| CN | 105046865 | A | * | 11/2015 | ............. G08B 17/10 |
| CN | 110322658 | A | * | 10/2019 | ............ A01M 29/34 |
| CN | 111179539 | A | * | 5/2020 | |
| CN | 111179540 | A | * | 5/2020 | |
| DE | 19605637 | | | 5/1997 | |
| EP | 0696787 | | | 6/1999 | |

* cited by examiner

*Primary Examiner* — Peter J Macchiarolo
*Assistant Examiner* — Jermaine L Jenkins
(74) *Attorney, Agent, or Firm* — Brooks, Cameron & Huebsch, PLLC

(57) ABSTRACT

Devices, systems, and methods for a lid of an aspirating smoke detector device are described herein. In some examples, one or more embodiments include an aspirating smoke detector device, comprising a plurality of light pipes, a cover including a plurality of apertures to interface with the plurality of light pipes, a housing including housing inlets and a housing outlet, and a reversible lid connectable to the cover in a first lid orientation and a second lid orientation, where when the cover and the housing are in a first device orientation, the reversible lid is to connect to the cover in the first lid orientation and when the cover and the housing are in a second device orientation, the reversible lid is to connect to the cover in the second lid orientation.

20 Claims, 5 Drawing Sheets

LID OF AN ASPIRATING SMOKE DETECTOR DEVICE

PRIORITY INFORMATION

This Application is a Continuation of U.S. application Ser. No. 17/335,350, filed on Jun. 1, 2021, the contents of which are incorporated herein by reference.

TECHNICAL FIELD

The present disclosure relates to devices, systems, and methods for a lid of an aspirating smoke detector device.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of aspirating smoke detector devices located throughout the facility (e.g., on different floors and/or in different rooms of the facility) that detect a hazard event, such as smoke generation (e.g., as the result of a fire or otherwise). The aspirating smoke detector can transmit a signal to the control panel in order to notify a building manager, occupants of the facility, emergency services, and/or others of the hazard event via alarms or other mechanisms.

DETAILED DESCRIPTION

Figure 1:
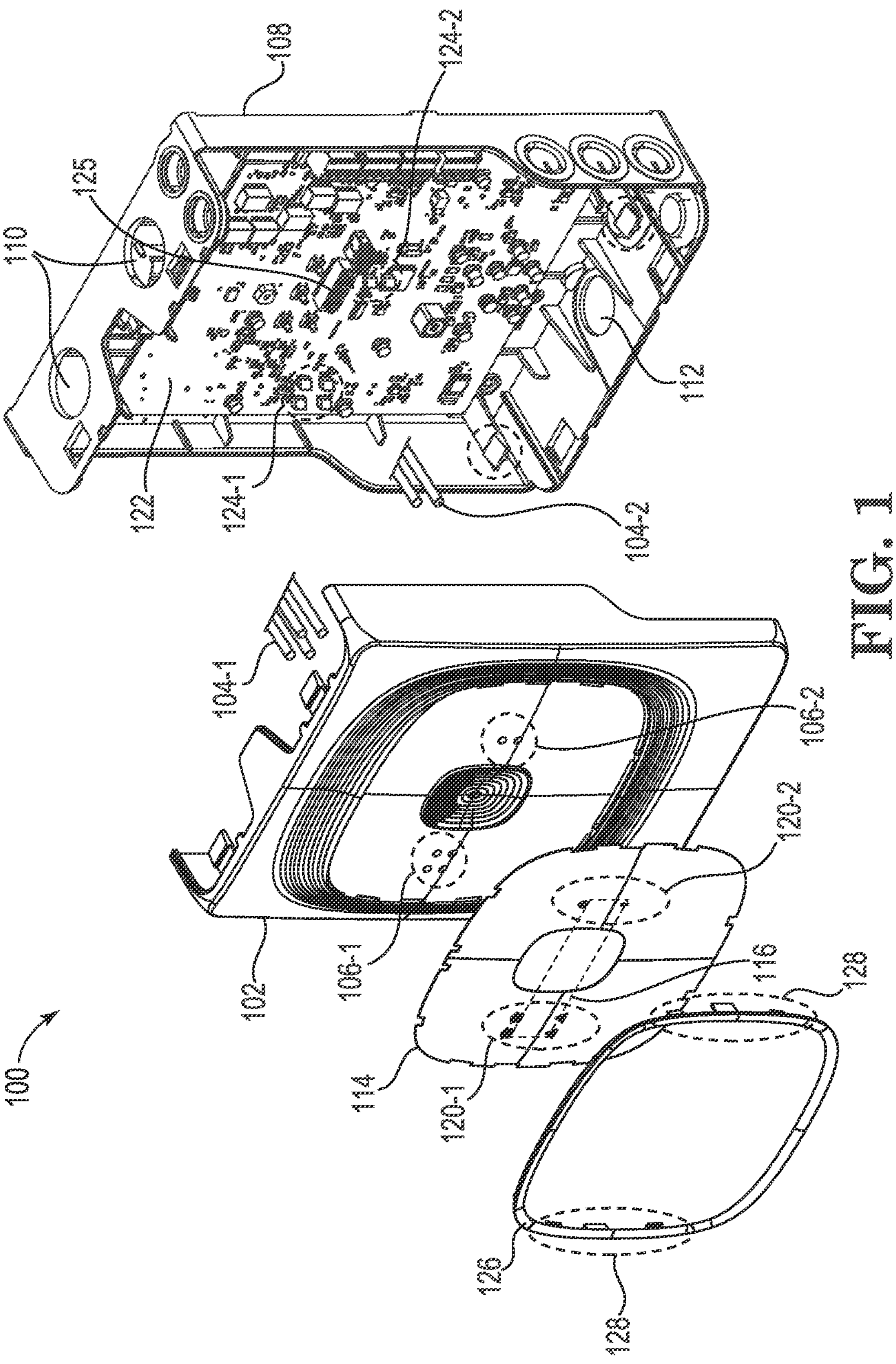
FIG. 1 is an exploded view of an example of an aspirating smoke detector device, in accordance with one or more embodiments of the present disclosure.

Devices, systems, and methods for a lid of an aspirating smoke detector device are described herein. In some examples, one or more embodiments include an aspirating smoke detector device, comprising a plurality of light pipes, a cover including a plurality of apertures to interface with the plurality of light pipes, a housing including housing inlets and a housing outlet, and a reversible lid connectable to the cover in a first lid orientation and a second lid orientation, where when the cover and the housing are in a first device orientation, the reversible lid is to connect to the cover in the first lid orientation and when the cover and the housing are in a second device orientation, the reversible lid is to connect to the cover in the second lid orientation.

An aspirating smoke detector device can be utilized in a facility to detect a hazard event by detecting the presence of smoke. The aspirating smoke detector device can draw gas (e.g., air, via a blower) from the facility into a sensor through a network of pipes throughout the facility. The sensor can sample the gas in order to determine whether the gas includes smoke particles. In response to detection of smoke particles, the aspirating smoke detector device can transmit a signal to a control panel in the facility to signal detection of smoke particles.

An aspirating smoke detector device may be installed in different facilities, as well as in varying locations within such facilities. In certain installation locations, the orientation of the aspirating smoke detector device may be dictated by the layout of the network of pipes making up the aspirating smoke detection system. For example, in certain installation locations an aspirating smoke detector device may have to be oriented based on the locations of inlet pipes and outlet pipes of the aspirating smoke detection system. In one installation location the aspirating smoke detector device may have to be oriented in a first orientation to connect to inlet pipes that are located “above” and outlet pipes that are located “below” the aspirating smoke detector device, whereas in another installation location the aspirating smoke detector device may have to be oriented in a second orientation to connect to inlet pipes that are located “below” and outlet pipes that are located “above” the aspirating smoke detector device.

As certain installation locations in a facility may cause the aspirating smoke detector device to be oriented up-side-down or in other orientations from other installation locations, a display of the aspirating smoke detector device may have to be oriented according to the orientation of the aspirating smoke detector device. The display of the aspirating smoke detector device can include different indicators to alert a user to a status of the aspirating smoke detector device, whether any alarms are active (e.g., smoke is detected), etc. Previous approaches included adding auxiliary circuit boards and/or connections to the aspirating smoke detector device to ensure a correct orientation of the display. However, such approaches can increase production and/or product costs.

A lid of an aspirating smoke detector device according to the present disclosure can allow for use of a reversible lid. The reversible lid can be connected to the housing for the aspirating smoke detector device based on an orientation of a cover and a housing. In such a manner, an aspirating smoke detector device can include a display that includes consistently located symbols in any operational configuration of the aspirating smoke detector device that alerts a user to a status of the aspirating smoke detector device, whether any alarms are active, etc., as well as complies with regional regulations and/or standards governing smoke detector devices while reducing production and/or product costs as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element “02” in FIG. 1, and a similar element may be referenced as 202 in FIG. 2.

As used herein, “a”, “an”, or “a number of” something can refer to one or more such things, while “a plurality of” something can refer to more than one such things. For example, “a number of components” can refer to one or more components, while “a plurality of components” can refer to more than one component.

FIG. 1 is an exploded view of an example of an aspirating smoke detector device 100, in accordance with one or more embodiments of the present disclosure. The aspirating smoke detector device 100 can include a cover 102, a housing 108, a plurality of light pipes 104-1, 104-2 (referred to collectively herein as a plurality of light pipes 104), a reversible lid 114, and a retaining frame 126.

As illustrated in FIG. 1, the aspirating smoke detector device 100 can comprise a housing 102. As used herein, the term “housing” refers to a shell of a device. For example, the housing 102 can make up a portion of the aspirating smoke detector device and can include various parts, as are further described herein.

The aspirating smoke detector device 100 can include light pipes 104. As used herein, the term “light pipe” refers to a device to transmit light for the purpose of illumination. The light pipes 104 can be of a transparent material to allow emitted light (e.g., from an LED of a PCB 122) to be transmitted through the light pipes 104 when the cover 102 and the reversible lid 114 are connected, as is further described herein. The light pipes 104 can be, for example, of a transparent acrylic material, although embodiments of the present disclosure are not so limited. For example, the light pipes 104 can be of any other transparent material.

As illustrated in FIG. 1, the light pipes 104 an include a first set of light pipes 104-1 and a second set of light pipes 104-2. The first set of light pipes 104-1 can be arranged in a first pipe configuration. As illustrated in FIG. 1, the first set of light pipes 104-1 can be arranged in a 2×2 array configuration. As used herein, the term “array” refers to an ordered group of devices. For example, the first set of light pipes 104-1 can be arranged in the 2×2 array configuration such that the first pipe configuration comprises two rows and two columns of light pipes, where each row has two light pipes and each column has two light pipes.

Additionally, the light pipes 104 include a second set of light pipes 104-2. The second set of light pipes 104-2 can be arranged in a second pipe configuration. The second set of pipes 104-2 can be arranged in a 2×1 array configuration. For example, the second set of light pipes 104-2 can be arranged in a 2×1 array configuration such that the second pipe configuration comprises two rows and one column of pipes, where each row has one light pipe and the column has two light pipes.

The aspirating smoke detector device 100 can further include a PCB 122. As used herein, the term “PCB” refers to a device to mechanically support and/or electrically connect electrical components via conductive traces. The PCB 122 can, therefore, include electrical components utilized in detection of smoke via the aspirating smoke detector device. The PCB 122 can be utilized to control a speed of a blower (e.g., not illustrated in FIG. 1), receive signals from sensor head housings (e.g., not illustrated in FIG. 1), etc. The PCB 122 can, accordingly, be utilized to control operation of the aspirating smoke detector device to detect smoke particles in a gas flowing through the aspirating smoke detector device and transmit a signal to a control panel in response to detection of smoke particles in the gas.

The PCB 122 can include a plurality of light emitting diodes (LEDs) 124. The LEDs 124 can be controlled by the PCB 122 such that the LEDs can light up during operation of the aspirating smoke detector device in order to indicate certain information about the operation of the aspirating smoke detector device.

The PCB 122 can include a first set of LEDs 124-1 and a second set of LEDs 124-2. As illustrated in FIG. 1, the first set of LEDs 124-1 can be arranged in a 2×2 array configuration to correspond to the 2×2 array configuration of the first set of light pipes 104-1 and the second set of LEDs 124-2 can be arranged in a 2×1 array configuration to correspond to the second set of light pipes 104-2. Accordingly, the light pipes 104 can be positioned over the LEDs 124 such that light emitted by the LEDs 124 is transmitted through the light pipes 104 and through a translucent portion 116 of the reversible lid 114, as is further described herein. For example, light emitted by the first set of LEDs 124-1 may be transmitted through the first set of light pipes 104-1 and light emitted by the second set of LEDs 124-2 may be transmitted through the second set of light pipes 104-2.

The aspirating smoke detector device 100 can include a cover 102. The cover 102 can be a “front” cover and can be connectable to a housing 108, as is further described herein. The cover 102 can include a plurality of apertures 106 to interface with the light pipes 104. As used herein, the term “aperture” refers to an opening. The apertures 106 can be openings through a thickness of the cover 102. As illustrated in FIG. 1, the apertures 106 can include a first set of apertures 106-1 and a second set of apertures 106-2. The first set of apertures 106-1 can interface with the first set of light pipes 104-1 and the second set of apertures 106-2 can interface with the second set of light pipes 104-2. The apertures 106 can allow for light emitted by the LEDs 124 to be visible when the aspirating smoke detector device 100 is assembled (e.g., the cover 102 is attached to the housing 108) and during operation of the aspirating smoke detector device.

The aspirating smoke detector device 100 can further include a housing 108. The housing 108 can be connectable to the cover 102. The PCB 122 can be housed by the housing 108.

The housing 108 can further include a housing inlets 110. The housing inlets 110 can be apertures in the structure of the housing 108. The housing inlets 110 can be connected to an inlet pipe of the aspirating smoke detection system, as is further described in connection with FIGS. 2 and 4.

Additionally, the housing 108 can include a housing outlet 112. The housing outlet 112 can also be an aperture in the structure of the housing 108, where the housing outlet 112 can be connected to an outlet pipe of the aspirating smoke detection system, as is further described in connection with FIGS. 2 and 4.

The cover 102, the housing 108, and/or the retaining frame 126 can be manufactured of a plastic material. For example, the cover 102, the housing 108, and/or the retaining frame 126 can be manufactured from acrylonitrile butadiene styrene (ABS) plastic, poly(methyl methacrylate) (PMMA) plastic, thermoplastic elastomers (TPE), among other types of plastic materials. Further, the cover 102, the housing 108, and/or the retaining frame 126 can be made of any other type of material (e.g., metal, carbon fiber, etc.). The cover 102, the housing 108, and/or the retaining frame 126 can be manufactured via multi-shot molding techniques, among other manufacturing techniques.

In order to facilitate installation of the aspirating smoke detector device 100 in varying locations and/or orientations in a facility, the aspirating smoke detector device 100 can include a reversible lid 114. As used herein, the term "lid" refers to a removable cover including symbols to convey information. The reversible lid 114 can, as illustrated in FIG. 1, include a plurality of symbols 120 to indicate information to a user, as is further described herein. Although not illustrated in FIG. 1 for clarity and so as not to obscure embodiments of the present disclosure, the reversible lid 114 can include the symbols 120 on both sides of the reversible lid 114. For example, the reversible lid 114 is illustrated in FIG. 1 in a first lid orientation, but in a second lid orientation the reversible lid 114 can also include symbols 120, as is further described in connection with FIGS. 3 and 4. That is, the reversible lid 114 is connectable to the cover 102 in the first lid orientation (e.g., as illustrated in FIG. 1) or in a second lid orientation.

The reversible lid 114 can include a translucent portion 116. As used herein, the term "translucent" refers to a material that permits light to pass through. For example, the reversible lid 114 can include the translucent portion 116 that can allow light emitted by the LEDs 124 and transmitted through the light pipes 104 and the apertures 106 to pass through the translucent portion 116 and be visible to a user during operation of the aspirating smoke detector device when the housing 100 is assembled.

As mentioned above, the reversible lid 114 can include a plurality of symbols 120. The symbols 120 can designate information. The symbols 120 can be different shapes, sizes, colors, etc. Such symbols 120 can, for instance, represent a status of the aspirating smoke detector device (e.g., operational, non-operational, errors, alarms, status information, etc.)

The symbols 120 can be positioned on the reversible lid 114 such that the symbols 120 are located substantially adjacent to light emitted from the light pipes 104 through the translucent portion 116. For example, the symbols 120 can be positioned such that when light is emitted through the translucent portion 116, the symbols 120 can be located adjacent to the light emitted through the translucent portion 116. As such, when light is emitted through the translucent portion 116 from a particular light pipe 104 and a particular symbol 120 is located adjacent to the light, the light can indicate to a user that the particular symbol 120 is relevant and indicates information to a user, as is further described herein.

The symbols 120 can include a first set of symbols 120-1 and a second set of symbols 120-2. As illustrated in FIG. 1, the first set of symbols 120-1 can be arranged in a first symbol configuration. The first symbol configuration can be, for example, a 2×2 array configuration. The 2×2 array configuration of the first set of symbols 120-1 can correspond to the 2×2 array configuration of the first set of light pipes 104-1 and the first set of LEDs 124-1. Accordingly, the first set of symbols 120-1 can be located substantially adjacent to light emitted from the first set of light pipes 104-1 via the first set of LEDs 124-1.

Additionally, the second set of symbols 120-2 can be arranged in a second symbol configuration. The second symbol configuration can be, for example, a 2×1 array configuration. The 2×1 array configuration of the second set of symbols 120-1 can correspond to the 2×1 array configuration of the second set of light pipes 104-2 and the second set of LEDs 124-2. Accordingly, the second set of symbols 120-2 can be located substantially adjacent to light emitted from the second set of light pipes 104-2 via the second set of LEDs 124-2.

As mentioned above, the symbols 120 can indicate information to a user in combination with the light emitted from the LEDs 124 and transmitted through the light pipes 104 and the translucent portion 116. For example, a top row of the first set of symbols 120-1 in the first symbol configuration (e.g., the 2×2 array configuration) can be alarm symbols. Accordingly, when light is emitted by one or both of the top row of the first set of LEDs 124-1 through the top row of the first set of light pipes 104-1 in the first pipe configuration (e.g., the 2×2 array configuration) and through the translucent portion 116, the light can be located adjacent to the top row of the first set of symbols 120-1, which can indicate to a user that the aspirating smoke detector device has detected smoke.

Although the light being described above as being emitted through the top row of the first set of light pipes 104-1 being adjacent to the top row of the first set of symbols 120-1 corresponds to an alarm, embodiments of the present disclosure are not so limited. For example, light can be emitted through a bottom row of the first set of light pipes 104-1 and be located adjacent to the bottom row of the first set of symbols 120-1 that can correspond to an indication that the aspirating smoke detector device is operational, corresponds to an indication of other status information, etc.

In order to secure the reversible lid 114 to the cover 102, a retaining frame 126 can be utilized. As used herein, the term "retaining frame" refers to a fastener that holds a component to another object. For example, the retaining frame 126 can secure the reversible lid 114 to the cover 102. In such a manner, the reversible lid 114 is connectable to the cover 102 via the retaining frame 126.

The retaining frame 126 can include a snap clip 128. As used herein, the term "snap clip" refers to a fastening mechanism including a protruding flange having an engagement tooth. The snap clip 128 can interface with the cover 102 to retain the reversible lid 114 to the cover 102. For example, the snap clip 128 can be deflected when interfacing with the cover 102 and the engagement tooth of the snap clip 128 can engage with a surface of the cover 102 to secure the snap clip 128 (e.g., and the retaining frame 126 and the reversible lid 114) to the cover 102.

As is further illustrated in FIG. 1, the PCB 122 can include a switch 125. As used herein, the term "switch" refers to an electrical component to disconnect or connect a conducting path in an electrical circuit, diverting or interrupting electric current in the conducting path of the electrical circuit. The switch 125 can be, for example, a dual in-line package (DIP) switch. The switch 125 can be in a first position or second position based on the orientation of the cover 102 and the housing 108, as is further described herein.

Figure 2:
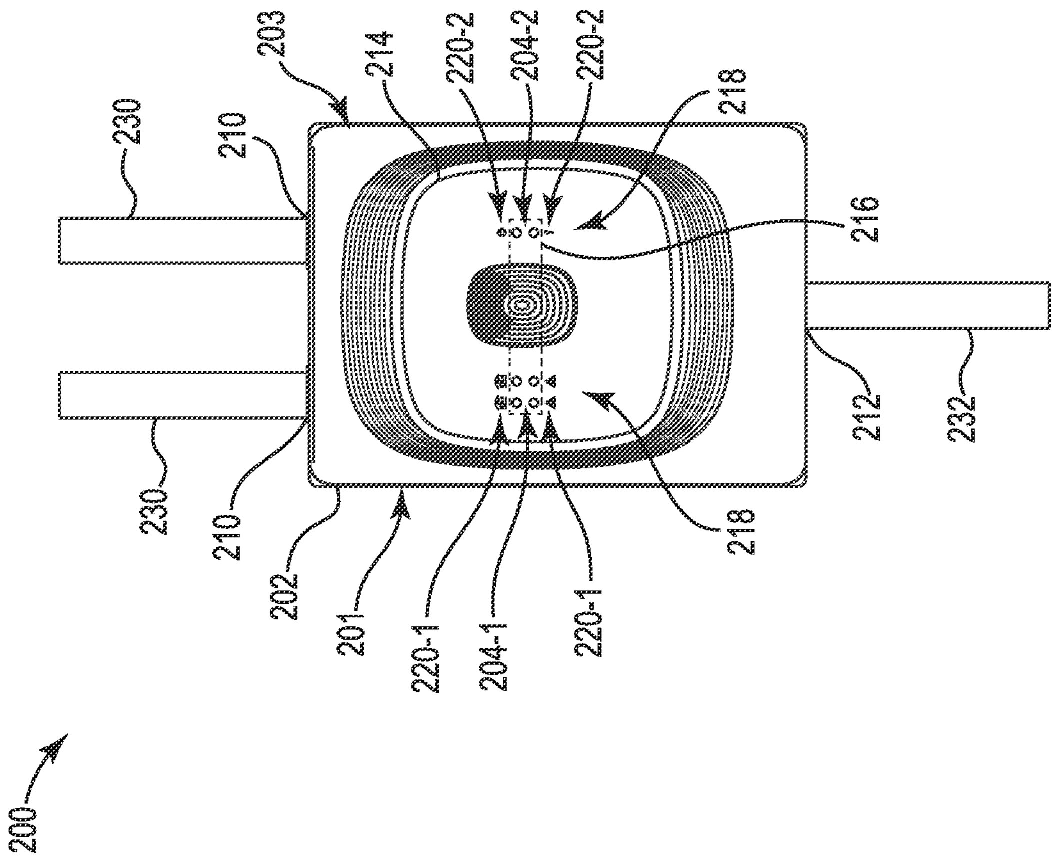
FIG. 2 is a front view of an example of an aspirating smoke detector device having a cover and a housing in a first device orientation and a reversible lid in a first lid orientation, in accordance with one or more embodiments of the present disclosure.

As mentioned above, the aspirating smoke detector device can be installed in varying locations in a facility, and such locations may dictate an orientation of the housing 100. As such, when the cover 102 and the housing 108 are in a first device orientation, the reversible lid 114 is configured to be connected to the cover 102 in the first lid orientation (e.g., as illustrated in FIGS. 1 and 2). In the first device orientation, the switch 125 can be in a first position. The first position of the switch 125 can allow the PCB 122 to know the cover 102 and the housing 108 are in the first device orientation and the reversible lid is in the first lid orientation to cause the PCB 122 to control the LEDs 124 accordingly.

Figure 4:
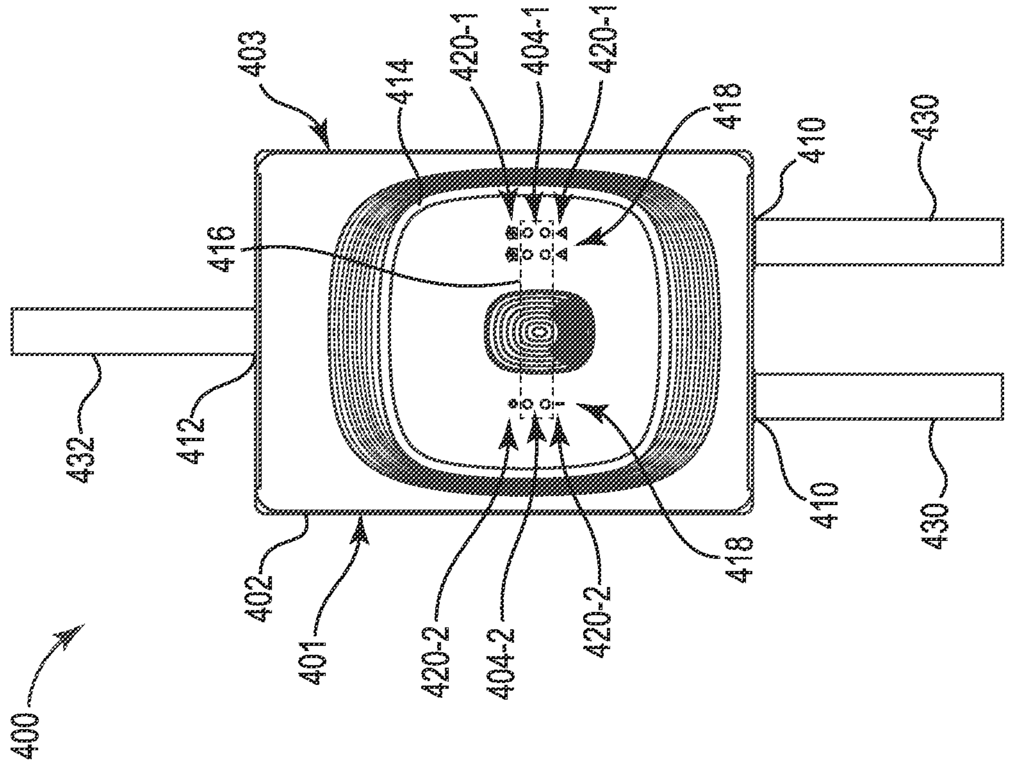
FIG. 4 is a front view of an example of an aspirating smoke detector device having a cover and a housing in a second device orientation and a reversible lid in a second lid orientation, in accordance with one or more embodiments of the present disclosure.

Further, when the cover 102 and the housing 108 are in a second device orientation, the reversible lid 114 is configured to be connected to the cover 102 in the second lid orientation (e.g., as illustrated in FIG. 4). In the second device orientation, the switch 125 can be in a second position. The second position of the switch 125 can allow the PCB 122 to know the cover 102 and the housing 108 are in the second device orientation and the reversible lid is in the second lid orientation to cause the PCB 122 to control the LEDs 124 accordingly. The first device orientation and the second device orientation are further described in connection with FIGS. 2 and 4, respectively.

FIG. 2 is a front view of an example of an aspirating smoke detector device 200 having a cover 202 and a housing in a first device orientation and a reversible lid 214 in a first lid orientation, in accordance with one or more embodiments of the present disclosure. The reversible lid 214 can include a translucent portion 216 and a plurality of symbols 220.

As illustrated in FIG. 2, the cover 202 and the housing (e.g., not illustrated in FIG. 2 for clarity and so as not to obscure embodiments of the present disclosure) can be in a first device orientation. When in the first device orientation, the housing inlets 210 of the housing can be connected to inlet pipes 230 of an aspirating smoke detection system. The inlet pipes 230 of the aspirating smoke detection system can draw air from a space in the facility and transport the air to the aspirating smoke detector device 200 to test the air for smoke particles. In the first device orientation as illustrated in FIG. 2, the inlet pipes 230 can be oriented "above" the housing 208 and be connected to a "top" portion of the housing.

Additionally when in the first device orientation, the housing outlet 212 of the housing can be connected to an outlet pipe 232 of the aspirating smoke detection system. The outlet pipe 232 can transport the air out of the housing 208 of the aspirating smoke detector device 200 following testing for smoke particles. In the first device orientation as illustrated in FIG. 2, the outlet pipe 232 can be oriented "below" the housing 208 and be connected to a "bottom" portion of the housing 208.

The reversible lid 214 can be connected to the cover 202 in a first lid orientation. The reversible lid 214 can include a translucent portion 216, a first set of symbols 220-1 arranged in a first symbol configuration (e.g., a 2×2 array configuration) such that the first set of symbols 220-1 are located substantially adjacent to light emitted from a first set of light pipes 204-1, and a second set of symbols 220-2 arranged in a second symbol configuration (e.g., a 2×1 array configuration) such that the second set of symbols 220-2 are located substantially adjacent to light emitted from a second set of light pipes 204-2.

When the cover 202 and the housing are in the first device orientation, the reversible lid 214 can be connected to the cover 202 in the first lid orientation. In the first lid orientation, the symbols 220 are in a first orientation as a result of the light pipes 204 being in a first orientation, as is further described herein.

For example, when the reversible lid 214 is connected to the cover 202 in the first lid orientation, the first set of light pipes 204-1 and the first set of symbols 220-1 are positioned on a first side 201 of the aspirating smoke detector device 200 and the second set of light pipes 204-2 and the second set of symbols 220-2 are positioned on a second side 203 of the aspirating smoke detector device 200. As illustrated in FIG. 2, the first set of light pipes 204-1 and the first set of symbols 220-1 can be positioned on a "left" side of the aspirating smoke detector device 200 (e.g., as oriented in FIG. 2). Additionally, the second set of light pipes 204-2 and the second set of symbols 220-2 are positioned on a "right" side of the aspirating smoke detector device 200 (e.g., as oriented in FIG. 2). Accordingly, when the cover 202 and the housing are in the first device orientation and the reversible lid 214 is in the first lid orientation, the first set of LEDs (e.g., not illustrated in FIG. 2), the first set of light pipes 204-1, and the first set of symbols 220-1 can be located on a first side 201 (e.g., left side) of the aspirating smoke detector device 200. The first set of light pipes 204-1 are arranged in the first pipe configuration (e.g., the 2×2 array configuration) oriented over a first set of LEDs (e.g., not illustrated in FIG. 2) and the first set of symbols 220-1 can be arranged in the first symbol configuration (e.g., the 2×2 array configuration) and positioned to be located substantially adjacent to light emitted from the first set of light pipes 204-1 through the translucent portion 216.

Additionally, the second set of LEDs (e.g., not illustrated in FIG. 2), the second set of light pipes 204-2, and the second set of symbols 220-2 can be located on a second side 203 (e.g., right side) of the aspirating smoke detector device 200. The second set of light pipes 204-2 are arranged in the second pipe configuration (e.g., the 2×1 array configuration) oriented over a second set of LEDs (e.g., not illustrated in FIG. 2) and the second set of symbols 220-2 can be arranged in the second symbol configuration (e.g., the 2×1 array configuration) and positioned to be located substantially adjacent to light emitted from the second set of light pipes 204-2 through the translucent portion 216.

When the cover 202 and the housing are in the first device orientation and the reversible lid 214 is in the first lid orientation, the switch (e.g., switch 125, previously described in connection with FIG. 1) can be in a first position. When the switch is in the first position, the switch indicates to the PCB controlling the aspirating smoke detector device that the cover 202 and the housing are in the first device orientation and the reversible lid 214 is in the first lid orientation, and to control the LEDs accordingly. For example, a top row of the first set of light pipes 204-1 and a top row of the first set of symbols 220-1 can correspond to an alarm, and the PCB can control the LEDs to cause light to emit through the top row of the first set of light pipes 204-1 in response to detection of smoke, among other examples.

Figure 3:
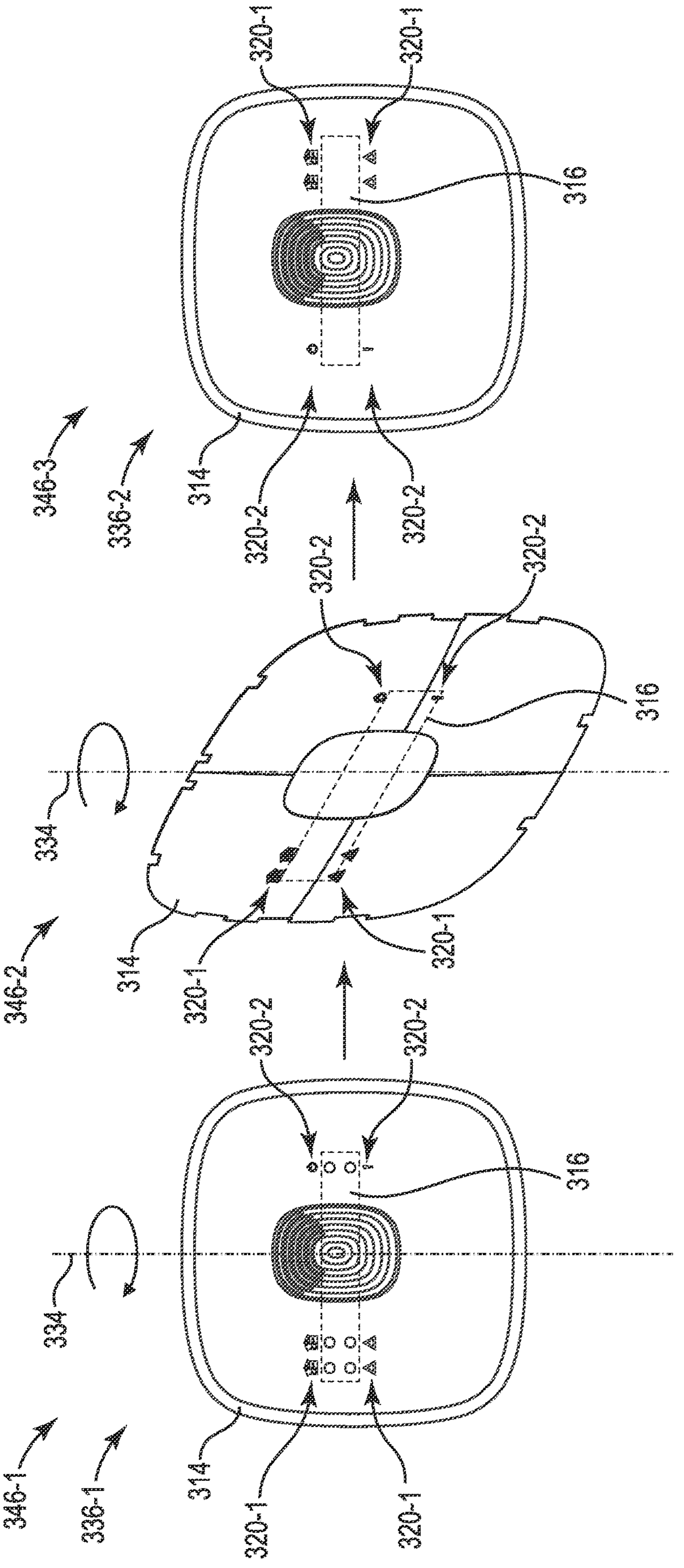
FIG. 3 is an example of a reversible lid of an aspirating smoke detector device, in accordance with one or more embodiments of the present disclosure.

FIG. 3 is an example of a reversible lid 314 of an aspirating smoke detector device, in accordance with one or more embodiments of the present disclosure. The reversible lid 314 can be rotated from the first lid orientation 336-1 to the second lid orientation 336-2.

As illustrated in FIG. 3, the reversible lid 314 can be in the first lid orientation 336-1 at point 346-1. The reversible lid 314 can include a translucent portion 316, a first set of symbols 320-1 in a first symbol configuration (e.g., a 2×2 array configuration) located on a first side (e.g., a left side of the substantially central vertical axis 334) of the reversible lid 314 and a second set of symbols 320-2 in a second symbol configuration (e.g., a 2×2 array configuration)

located on a second side (e.g., a right side of the substantially central vertical axis 334) of the reversible lid 314.

In an example in which an aspirating smoke detector device is installed in an orientation that calls for the reversible lid 314 to be in the second lid orientation 336-2, the reversible lid 314 can be oriented by rotating the reversible lid 314. As illustrated in FIG. 3, the reversible lid 314 can be rotated about a substantially central vertical axis 334. For instance, as illustrated at point 346-2, the reversible lid 314 can be in the process of being rotated about the substantially central vertical axis 334. When the reversible lid 314 has been rotated to point 346-3, the reversible lid 314 can be in the second lid orientation 336-2.

In the second lid orientation 336-2, the reversible lid 314 can still include the translucent portion 316. Further, the first set of symbols 320-1 in the first symbol configuration (e.g., a 2×2 array configuration) located on the second side (e.g., the right side of the substantially central vertical axis 334) of the reversible lid 314 and the second set of symbols 320-2 in the second symbol configuration (e.g., a 2×2 array configuration) located on the first side (e.g., the left side of the substantially central vertical axis 334) of the reversible lid 314. In other words, the second lid orientation 336-2 is opposite of the first lid orientation 336-1. The opposite lid orientations of the reversible lid 314 can allow for consistent locations for the symbols 320 (e.g., alarm symbols on a top row) no matter the orientation of the housing (e.g., the orientation of a cover and a housing) of an aspirating smoke detector device.

Although the reversible lid 314 is illustrated in FIG. 3 as being rotated counterclockwise from the first lid orientation 336-1 to the second lid orientation 336-2 between points 346-1, 346-2, and 346-3, embodiments of the present disclosure are not so limited. For example, the reversible lid 314 can be rotated clockwise from the first lid orientation 336-1 to the second lid orientation 336-2.

In addition, in an example in which the aspirating smoke detector device is moved or installed such that the reversible lid 314 is to be in the first lid orientation, the reversible lid 314 can be oriented accordingly. For example, the reversible lid 314 can be rotated from the second lid orientation 336-2 to the first lid orientation 336-1 between points 346-3, 346-2, and 346-1 in a clockwise or counterclockwise direction about the substantially central vertical axis 334.

FIG. 4 is a front view of an example of an aspirating smoke detector device 400 having a cover 402 and a housing in a second device orientation and a reversible lid 414 in a second lid orientation, in accordance with one or more embodiments of the present disclosure. The reversible lid 414 can include a translucent portion 416 and a plurality of symbols 420.

As illustrated in FIG. 4, the cover 402 and the housing (e.g., not illustrated in FIG. 4 for clarity and so as not to obscure embodiments of the present disclosure) can be in a second device orientation. When in the second device orientation, the housing inlets 410 of the housing can be connected to inlet pipes 430 of an aspirating smoke detection system. In the second device orientation as illustrated in FIG. 4, the inlet pipes 430 can be oriented "below" the housing 408 and be connected to a "bottom" portion of the housing. As such, the second device orientation of the cover 402 and the housing can be "upside down" as compared with the first device orientation (e.g., as previously illustrated and described in connection with FIG. 2).

When in the second device orientation, the housing outlet 412 of the housing can be connected to an outlet pipe 432 of the aspirating smoke detection system. In the second device orientation as illustrated in FIG. 4, the outlet pipe 432 can be oriented "above" the housing 408 and be connected to a "top" portion of the housing.

As opposed to the first lid orientation (e.g., previously described in connection with FIG. 2), the reversible lid 414 can be connected to the cover 402 in a second lid orientation. The reversible lid 414 can include a translucent portion 416, a first set of symbols 420-1 arranged in a first symbol configuration (e.g., a 2×2 array configuration) such that the first set of symbols 420-1 are located substantially adjacent to light emitted from a first set of light pipes 404-1, and a second set of symbols 420-2 arranged in a second symbol configuration (e.g., a 2×1 array configuration) such that the second set of symbols 420-2 are located substantially adjacent to light emitted from a second set of light pipes 404-2. The reversible lid 414 can be rotated (e.g., as previously described in connection with FIG. 3) from the first lid orientation to the second lid orientation illustrated in FIG. 4.

When the cover 402 and the housing are in the second device orientation, the reversible lid 414 can be connected to the cover 402 in the second lid orientation. In the second lid orientation, the symbols 420 are in a second orientation as a result of the light pipes 404 being in a second orientation, as is further described herein.

For example, when the reversible lid 414 is connected to the cover 402 in the second lid orientation, the first set of light pipes 404-1 and the first set of symbols 420-1 are positioned on the second side 403 of the aspirating smoke detector device 400 and the second set of light pipes 404-2 and the second set of symbols 420-2 are positioned on the first side 401 of the aspirating smoke detector device 400. As illustrated in FIG. 4, the first set of light pipes 404-1 and the first set of symbols 420-1 can be positioned on a "right" side of the aspirating smoke detector device 400 (e.g., as oriented in FIG. 4). Additionally, the second set of light pipes 404-2 and the second set of symbols 420-2 are positioned on a "left" side of the aspirating smoke detector device 400 (e.g., as oriented in FIG. 4). Accordingly, when the cover 402 and the second cover are in the second device orientation and the reversible lid 414 is in the second lid orientation, the first set of LEDs (e.g., not illustrated in FIG. 4), the first set of light pipes 404-1, and the first set of symbols 420-1 can be located on a second side 403 (e.g., right side) of the aspirating smoke detector device 400. The first set of light pipes 404-1 are arranged in the first pipe configuration (e.g., the 2×2 array configuration) oriented over a first set of LEDs (e.g., not illustrated in FIG. 4) and the first set of symbols 420-1 can be arranged in the first symbol configuration (e.g., the 2×2 array configuration) and positioned to be located substantially adjacent to light emitted from the first set of light pipes 404-1 through the translucent portion 416.

Additionally, the second set of LEDs (e.g., not illustrated in FIG. 4), the second set of light pipes 404-2, and the second set of symbols 420-2 can be located on a first side 401 (e.g., left side) of the aspirating smoke detector device 400. The second set of light pipes 404-2 are arranged in the second pipe configuration (e.g., the 2×1 array configuration) oriented over a second set of LEDs (e.g., not illustrated in FIG. 4) and the second set of symbols 420-2 can be arranged in the second symbol configuration (e.g., the 2×1 array configuration) and positioned to be located substantially adjacent to light emitted from the second set of light pipes 404-2 through the translucent portion 416.

When the cover 402 and the housing are in the second device orientation and the reversible lid 414 is in the second lid orientation, the switch (e.g., switch 125, previously described in connection with FIG. 1) can be in a second position. When the switch is in the second position, the switch indicates to the PCB controlling the aspirating smoke detector device that the cover 402 and the housing are in the second device orientation and the reversible lid 414 is in the second lid orientation, and to control the LEDs accordingly. For example, the top row of the first set of light pipes 404-1 and the top row of the first set of symbols 420-1 can correspond to the alarm in either lid orientation of the reversible lid 414. Accordingly, the PCB can control the LEDs to cause light to emit through the top row of the first set of light pipes 404-1 in response to detection of smoke, among other examples.

Accordingly, the second lid orientation of the reversible lid 414 can be opposite the first lid orientation. The reversible lid 414 can, accordingly, be utilized by the aspirating smoke detector device 400 whether the cover 402 and the second housing are in the first device orientation or the second device orientation, allowing for symbols that are consistently located on the reversible lid that can comply with regional regulations and/or standards governing aspirating smoke detector devices.

Figure 5:
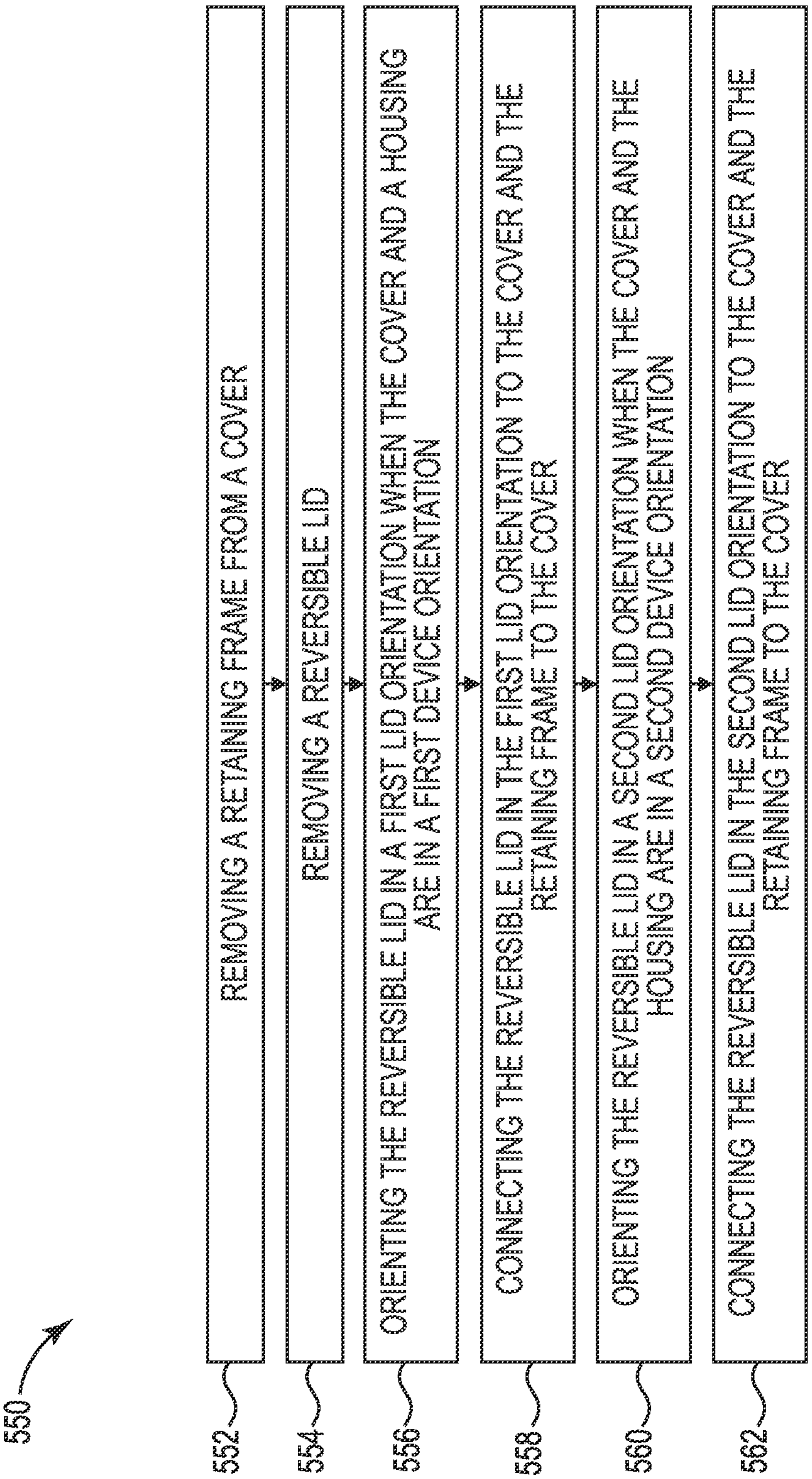
FIG. 5 is an example of a method of operating an aspirating smoke detector device, in accordance with one or more embodiments of the present disclosure.

FIG. 5 is an example of a method of operating an aspirating smoke detector device, in accordance with one or more embodiments of the present disclosure. At 552, the method 550 can include removing a retaining frame from a cover. In an example in which the aspirating smoke detector device is to be moved to another installation location, the retaining frame can be removed from the cover of the aspirating smoke detector device. The cover can include a plurality of apertures that can interface with a plurality of light pipes of the aspirating smoke detector device.

The retaining frame can be configured to retain the reversible lid to the cover in a first lid orientation and a second lid orientation. Accordingly, if the aspirating smoke detector device is to be moved such that the cover and a housing are in a different orientation, the reversible lid can be oriented accordingly, as is further described herein.

At 554, the method 550 can include removing, from the cover, the reversible lid. The reversible lid can include a translucent portion, a first set of symbols and a second set of symbols.

At 556, the method 550 can include orienting, when the cover and the housing are to be in a first device orientation, the reversible lid in a first lid orientation. Orienting the reversible lid in the first lid orientation can include rotating the reversible lid from a second lid orientation to the first lid orientation about a substantially central vertical axis of the reversible lid. The reversible lid in the first lid orientation can include the first set of symbols in a first symbol configuration (e.g., a 2×2 array configuration) and the second set of symbols in a second symbol configuration (e.g., a 2×1 array configuration).

In the first lid orientation, the first set of symbols can be positioned on a first side of the cover and located substantially adjacent to light emitted through a first set of light pipes included in the plurality of light pipes of the aspirating smoke detector device. Additionally, the second set of symbols can be positioned on a second side of the cover and located substantially adjacent to light emitted through a second set of light pipes included in the plurality of light pipes. When the cover and the housing are in the first device orientation, the method 550 can include positioning a switch in a first position.

At 558, the method 550 can include connecting the reversible lid in the first lid orientation to the cover in response to the cover and the housing being in the first device orientation. Additionally, at 558, the method 550 can include connecting the retaining frame to the cover. Connecting the retaining frame to the cover can allow for the retaining frame to secure the reversible lid to the cover in the first lid orientation.

At 560, the method 550 can include orienting, when the cover and the housing are in a second device orientation, the reversible lid in a second lid orientation. Orienting the reversible lid in the second lid orientation can include rotating the reversible lid from the first lid orientation to the second lid orientation about the substantially central vertical axis of the reversible lid. The reversible lid in the second lid orientation can include the first set of symbols in the first symbol configuration (e.g., a 2×2 array configuration) and the second set of symbols in the second symbol configuration (e.g., a 2×1 array configuration).

In the second lid orientation, the first set of symbols can be positioned on the second side of the cover and located substantially adjacent to light emitted through the first set of light pipes. Additionally, the second set of symbols can be positioned on the first side of the cover and located substantially adjacent to light emitted through the second set of light pipes. When the cover and the housing are in the second device orientation, the method 550 can include positioning a switch in a second position.

At 562, the method 550 can include connecting the reversible lid in the second lid orientation to the cover in response to the cover and the housing being in the second device orientation. Additionally, at 562, the method 550 can include connecting the retaining frame to the cover. Connecting the retaining frame to the cover can allow for the retaining frame to secure the reversible lid to the cover in the second lid orientation.

Accordingly, the reversible lid can be connected to the cover based on the orientation of the cover and the housing in order to provide a display that includes consistently located symbols in any operational configuration of the aspirating smoke detector device that complies with regional regulations and/or standards governing aspirating smoke detector devices.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combinations of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An aspirating smoke detector device, comprising:

a plurality of light pipes;

a cover including a plurality of apertures to interface with the plurality of light pipes; and a reversible lid connectable to the cover in a first lid orientation and a second lid orientation, wherein a first side of the reversible lid is displayed in the first lid orientation and a second side of the reversible lid is displayed in the second lid orientation.

2. The aspirating smoke detector device of claim 1, wherein when the aspirating smoke detector device is in a first orientation, the reversible lid is configured to connect to the cover in the first lid orientation.

3. The aspirating smoke detector device of claim 2, wherein when the aspirating smoke detector device is in a second orientation, the reversible lid is configured to connect to the cover in the second lid orientation.

4. The aspirating smoke detector device of claim 1, wherein the aspirating smoke detector device further includes a housing having housing inlets and a housing outlet.

5. The aspirating smoke detector device of claim 1, wherein the aspirating smoke detector device further includes a printed circuit board (PCB) configured to detect smoke particles in a gas flowing through the aspirating smoke detector device.

6. The aspirating smoke detector device of claim 5, wherein in response to the PCB detecting the smoke particles, the PCB is configured to transmit a signal to a control panel.

7. The aspirating smoke detector device of claim 1, wherein the reversible lid includes a translucent portion to allow light from the plurality of light pipes to pass through the reversible lid in the first lid orientation and in the second lid orientation.

8. The aspirating smoke detector device of claim 1, wherein the reversible lid includes a first plurality of symbols on the first side and a second plurality of symbols on the second side, wherein the first plurality of symbols of the reversible lid are displayed in the first lid orientation and the second plurality of symbols of the reversible lid are displayed in the second lid orientation.

9. An aspirating smoke detector device, comprising:

a plurality of light pipes including:

a first set of light pipes arranged in a first pipe configuration; and a second set of light pipes arranged in a second pipe configuration;

a cover including a plurality of apertures to interface with the plurality of light pipes; and a reversible lid connectable to the cover in a first lid orientation and a second lid orientation, the reversible lid including a translucent portion having a plurality of symbols;

wherein:

when the aspirating smoke detector device is in a first orientation, the reversible lid is configured to connect to the cover in the first lid orientation; and when the aspirating smoke detector device is in a second orientation, the reversible lid is configured to connect to the cover in the second lid orientation.

10. The aspirating smoke detector device of claim 9, wherein the plurality of symbols include:

a first set of symbols arranged in a first symbol configuration such that the first set of symbols are located substantially adjacent to light emitted from the first set of light pipes; and a second set of symbols arranged in a second symbol configuration such that the second set of symbols are located substantially adjacent to light emitted from the second set of light pipes.

11. The aspirating smoke detector device of claim 10, wherein the first pipe configuration and the first symbol configuration are 2×2 array configurations.

12. The aspirating smoke detector device of claim 10, wherein the second pipe configuration and the second symbol configuration are 2×1 array configurations.

13. The aspirating smoke detector device of claim 9, wherein the second lid orientation is opposite of the first lid orientation.

14. The aspirating smoke detector device of claim 9, wherein the aspirating smoke detector device further includes a housing having a printed circuit board (PCB) having a plurality of light emitting diodes (LEDs).

15. The aspirating smoke detector device of claim 14, wherein the plurality of light pipes are positioned over the plurality of LEDs such that light emitted by the plurality of LEDs is transmitted through the plurality of light pipes and through the translucent portion of the reversible lid.

16. An aspirating smoke detector device, comprising:

a plurality of light pipes including:

a first set of light pipes arranged in a first pipe configuration; and a second set of light pipes arranged in a second pipe configuration;

a cover including a plurality of apertures to interface with the plurality of light pipes; and a reversible lid connectable to the cover in a first lid orientation and a second lid orientation, the reversible lid including a translucent portion having a plurality of symbols including:

a first set of symbols arranged in a first symbol configuration such that the first set of symbols are located substantially adjacent to light emitted from the first set of light pipes; and a second set of symbols arranged in a second symbol configuration such that the second set of symbols are located substantially adjacent to light emitted from the second set of light pipes.

17. The aspirating smoke detector device of claim 16, wherein:

a first row of the first set of symbols indicates information to a user when light is emitted from a subset of light pipes corresponding to the first row; and a second row of the first set of symbols indicates different information to the user when light is emitted from a subset of light pipes corresponding to the second row.

18. The aspirating smoke detector device of claim 17, wherein:

the first row of the first set of symbols indicates the aspirating smoke detector device is operational; and the second row of the first set of symbols indicates the aspirating smoke detector device has detected smoke particles.

19. The aspirating smoke detector device of claim 16, wherein the aspirating smoke detector device further includes a printed circuit board (PCB) having a switch.

20. The aspirating smoke detector device of claim 19, wherein:

when the aspirating smoke detector device is in a first orientation, the switch is in a first position; and when the aspirating smoke detector device is in a second orientation, the switch is in a second position.

* * * * *